United States Patent
Ide et al.

(10) Patent No.: US 6,741,017 B1
(45) Date of Patent: May 25, 2004

(54) ELECTRON SOURCE HAVING FIRST AND SECOND LAYERS

(75) Inventors: Tetsuya Ide, Kanagawa (JP); Masao Urayama, Saitama (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 09/620,999

(22) Filed: Jul. 21, 2000

(30) Foreign Application Priority Data

Jul. 21, 1999 (JP) .......................................... 11/205730
Apr. 24, 2000 (JP) ..................................... 2000/123180

(51) Int. Cl.[7] ................................................ H01J 1/02
(52) U.S. Cl. ..................... 313/310; 313/309; 313/495
(58) Field of Search ................................ 313/310, 309, 313/311, 336, 495, 346 R

(56) References Cited

U.S. PATENT DOCUMENTS

| | | | | |
|---|---|---|---|---|
| 5,726,524 A | * | 3/1998 | Debe | 204/192.1 |
| 5,973,444 A | * | 10/1999 | Xu et al. | 313/309 |
| 6,097,138 A | * | 8/2000 | Nakamoto | 313/309 |
| 6,181,055 B1 | * | 1/2001 | Patterson et al. | 313/309 |
| 6,283,812 B1 | * | 9/2001 | Jin et al. | 445/24 |
| 6,380,671 B1 | * | 4/2002 | Lee | 313/310 |
| 6,400,091 B1 | * | 6/2002 | Deguchi et al. | 315/169.1 |
| 6,498,424 B1 | * | 12/2002 | Saito et al. | 313/309 |
| 6,515,415 B1 | * | 2/2003 | Han et al. | 313/496 |

FOREIGN PATENT DOCUMENTS

| | | |
|---|---|---|
| JP | 3-45565 | 2/1991 |
| JP | 2558993 | 9/1996 |
| JP | 08-321256 A | 12/1996 |
| JP | 09-106770 A | 4/1997 |
| JP | 10-12124 | 1/1998 |
| JP | 10-265208 | 10/1998 |
| JP | 11-265653 A | 9/1999 |

OTHER PUBLICATIONS

"A Carbon Nanotube Field–Emission Electron Source", deHeer, et al. Science, vol. 270 (Nov. 17, 1995), pp. 1179–1180.

* cited by examiner

*Primary Examiner*—Vip Patel
*Assistant Examiner*—Kevin Quarterman
(74) *Attorney, Agent, or Firm*—David G. Conlin; David A. Tucker; Edwards & Angell, LLP

(57) ABSTRACT

Disclosed is a cold cathode electron source characterized in that a cold cathode material which can achieve electron emission in a low electric field (e.g., a carbon nanotube), necessary constituent elements are provided individually in uncalcined ceramic sheets (green sheets 21, 43, 46) and the sheets are laminated and calcined to form an integral structure. The electron source can be manufactured by forming through-holes 20 in a flat plate, charging a conductive paste 30 containing carbon nanotubes 31 dispersed therein into the through-holes 20 by vacuum suction, thereby causing to orient the carbon nanotubes 31 in the axis direction of the through-hoes 20. The electron source is useful for the low-cost manufacture of a device with a cold cathode electron source which can achieve ready vacuum evacuation and maintenance of the vacuum level, as well as a high emission current density at a low voltage.

3 Claims, 14 Drawing Sheets

ELECTRON SOURCE HAVING FIRST AND SECOND LAYERS

FIELD OF THE INVENTION

The present invention relates to an electron source and a process for manufacturing the same. More specifically, the present invention relates to a cold cathode electron source applicable to a back light for a liquid crystal device, various types of light sources, and a flat panel display for a computer or television, and also relates to a process for manufacturing the cold cathode electron source.

RALATED BACKGROUND ART

In a conventional electron tube, such as a cathode ray tube (CRT), a hot cathode has been used as the electron source. A hot cathode is a cathode which utilizes thermionic emission to produce electrons. Thermionic emission is a mechanism in which a cathode material is heated to 1500–2700 K to apply energy higher than the work function to free electrons in the conduction band, whereby electrons are emitted beyond the potential barrier of the surface of the cathode material. Examples of such material include pure metals and oxides. The material most frequently used today is a sintered-type material prepared by press-sintering a mixture of a barium (Ba)-based compound (e.g., $5BaO \cdot 2Al_2O_3 \cdot CaO$) and tungsten (W) powder or an impregnated-type material prepared by impregnating porous W with a Ba-based compound in a molten state. The two types of materials have an advantage in that the electron emission density is high and, in addition, the discharge of gas generated during vacuum evacuation is small and the cathode material can be re-activated even when the cathode is exposed to the atmosphere because barium aluminate is contained in the material.

Besides thermionic emission, electron emission includes field emission, secondary electron emission, photoelectron emission and so on.

A cold cathode is a cathode which can emit electrons by field emission. In a field emission type of cathode, a high electric field ($10^9$ V/m) is applied in the vicinity of the surface of the cathode material to lower the potential barrier of the surface (which is the so-called "tunneling effect"), whereby electrons are emitted. This type of cathode is called a "cold cathode" because it does not require the heating of the cathode material like a hot cathode.

The current-voltage characteristic of a field emission type of cold cathode can be approximated in accordance with the Fowler-Nordheim equation. The electron-emitting section of the cold cathode is designed to have such a structure that the field enhancement factor is increased (i.e., a needle-like structure), since a high electric field is applied to the electron-emitting section while keeping the insulation state. An early type of cold cathode has a diode type structure formed by electrolytic polishing of a needle-shaped single crystal. In recent days, however, a remarkable progress has been made in the technique for manufacturing field emission type of electron sources (i.e., field emitter arrays) which can emit electrons in a high electric field by virtue of the development of micromachining techniques as used in the field of integrated circuits or thin films. In particular, a field emission type of cold cathode with a microstructure has been manufactured successfully. Such a field emission type of cold cathode is the most essential electron emitting element among the essential elements of a triode type micro-electron tube or micro-electron gun. A field emission type of cold cathode with a microstructure has an advantage in that a higher current density can be provided to a hot cathode.

A field emission display (FED) with a cold cathode is expected to be applicable to a self-emitting type of flat panel display. Under these situations, research and development of a field emission type of electron source have been aggressively made.

FIG. 14 is a sectional view showing the basic configuration of a prior art FED.

"As shown in FIG. 14, the FED consists mainly of a back plate 18 which effects the emission of electrons; a face plate 10 in which fluorescence-emission is effected from a luminant 11 by irradiation of an electron beam 2 from the back plate 18, whereby an image is displayed thereon; side walls 19 for vacuum-sealing a space between the back plate 18 and the face plate 10; and spacers 15 for supporting the gap between the back plate 18 and the face plate 10 and maintaining the strength of the structure of the FED against atmospheric pressure. The back plate 18 is provided with a gate electrode 14 via an insulator 16. The gate electrode 14 is used for the application of an electric field to a cold cathode 13. The cathode lines and the gate lines usually form together the X–Y matrix for addressing of pixels. When the gap between the back plate 18 and the face plate 10 is wide, a focusing electrode 17 may be required for focusing the electron beam 2. Since the FED is a type of vacuum device like a CRT or a vacuum tube, a micropump called a "getter" is disposed in the vacuum space between the back plate 18 and the face plate 10 for the purpose of maintaining the vacuum level of the vacuum space after the vacuum-sealing thereof. The getter includes an evaporation type and a non-evaporation type. An evaporation type getter generates a fresh and active gettering surface thereon by heating evaporation or the like, on which evacuation is achieved by means of the chemical adsorption of gas onto the gettering surface. In a non-evaporation type getter, gas chemically adsorbed on the gettering surface (which has been activated by heating to a high temperature) is diffused into the getter material, whereby evacuation is achieved. If the non-evaporation type getter is made of the same material, its evacuation ability depends on the volume and the surface area thereof, and becomes higher as the volume and surface area become larger."

In the field emission, the amount of emission current may vary 2 to 3 times for 2 to 3% of change in electric field. Therefore, when the field emission is applied to a FED, it is required to introduce a control layer, such as a ballast resistor layer.

On the other hand, there has been reported a laminate of a metal plate having through-holes and a control electrode for an electron beam to manufacture a hot cathode electron source (Japanese Patent No. 2558993).

It has been proposed to use a ceramic substrate laminate for the formation of ribs in a plasma display (Japanese Patent Application Laid-open No. 3-45565).

As the material of a field emission type of electron source for a FED, various kinds of materials have been known. Recently, a carbon nanotube (CNT) has attracted much attention as the electron emission material.

A carbon nanotube was originally developed by Iijima et al (S. Iijima, Nature, 354, 56, 1991). The carbon nanotube has a nested structure of cylindrically wound graphite layers, of which tip has a diameter of about 10 nm. The carbon nanotube is believed to be a very excellent material as an electron source array due to its properties such as high resistance against oxidation and ion bombardment. There are experimental reports on the field emission from carbon nanotubes by the research groups of R. E. Smalley et al. (A. G. Rinzler, Science, 269, 1550, 1995) and W. A. de Heer et al. (W. A. de Heer, Science, 270, 1179, 1995). The carbon nanotubes used in these experiments were casted on a metal thin plate.

The carbon nanotube has a structure having a high aspect ratio. Therefore, the electron source using carbon nanotubes is assumed to exert a higher electron emission efficiency when the carbon nanotubes are oriented in the direction of the electric field applied.

As a known electron emission element using oriented carbon nanotubes, there is mentioned a triode type one comprising carbon nanotubes which are selectively grown in small holes provided in an anode oxide film (Japanese Patent Application Laid-open No. 10-12124). In the electron emission device, the variation in properties of the electron source in each pixel is reduced and the stability of current intensity per pixel is improved.

It has been also proposed to orient carbon nanotubes on SiC crystals under vacuum (Japanese Patent Application Laid-open No. 10-265208).

However, in the fabrication process of the conventional FED, a back plate is prepared by forming a ballast resistors, cathode lines, gate lines and an insulating layer successively. When the formation is to be performed using a vacuum apparatus, the process becomes more complicated. In a FED, the gap between the back plate and the face plate is invariant even if its screen size is increased. Therefore, when it is intended to manufacture a large-screen FED, it is difficult to maintain the vacuum level of the vacuum space between the face and back plates simply by providing getters in the vicinity of the side walls and the corners.

The formation of ribs in a plasma display mentioned above is made only for the convenient formation of the configuration of the display, and does not take electrical wiring or maintenance of the vacuum level into account.

In the lamination of metal plates mentioned above, it is difficult to put the electrodes closer to each other for the reason that it is needed to keep a some certain distance between the electrodes for maintaining the insulated state. It is also difficult to form the X–Y matrix as an extraction electrode of the cathode.

In the conventional carbon nanotube cold cathode electron source with small holes provided on an anode oxide film, there is a problem of the damage to Al contained in the substrate due to the high temperature condition employed for the production of the carbon nanotubes. On the other hand, when it is intended to orient the carbon nanotubes on SiC crystals, a special apparatus is needed, since the formation and patterning of the carbon nanotubes are performed in a vacuum. Moreover, due to the high density of the carbon nanotubes on the crystals, the level of field enhancement determined depending on the structural factor of the carbon nanotubes may become small. Thus, it is hard to utilize such an advantageous property of a carbon nanotube that it can emit electrons at a low voltage.

SUMMARY OF THE INVENTION

The present invention has been made in view of these circumstances. Accordingly, the object of the present invention is to provide the low-cost manufacture of a device with a cold cathode electron source which can perform vacuum evacuation and maintain the vacuum level and can also provide a high emission current density at a low voltage.

Accordingly, the present invention provides an electron source comprising a first layer having at least a cathode electrode and an emitter section, a second layer having a control electrode which is disposed on the first layer and a spacer or spacers disposed on the second layer; the first and second layers being laminated to form a sheet-like structure, and the laminated structure being calcined to form an integral structure having the spacers thereon.

By providing the constituent elements on a plurality of uncalcined ceramic sheets, respectively, and laminating and calcining the sheets to form an integral structure, it becomes possible to form a laminate structure without the need of multilayer formation technique using a vacuum apparatus for layer-formation and a printing apparatus.

In the electron source, a plurality of through-holes may be formed in the first layer and a room for gettering may be provided on the backside of the first layer. These contrivances enable to maintain the vacuum level of the vacuum sealing tube and insulate from the gate lines.

In a preferred embodiment of the electron source, the emitter section may comprise a material capable of emitting electrons at a field strength of 10 V/pm or lower, or the emitter section may comprise a carbon nanotube.

The present invention also provides a process for manufacturing an electron source, the process comprising sucking a material containing carbon nanotubes dispersed therein into through-holes provided on a flat plate to cause the orientation of the carbon nanotubes in the material in the axis direction of the through-holes.

The present invention further provides a process for manufacturing an electron source, the process comprising press-charging a material containing carbon nanotubes dispersed therein into through-holes provided on a flat plate to cause the orientation of the carbon nanotube in the material in the axis direction of the through-holes.

The charge of the material containing the carbon nanotubes into the through-holes by suction or application of pressure enables to cause the orientation of the carbon nanotubes in the through-holes without the need of any orientation process or processing.

In a preferred embodiment of the process, the tip of each of the through-holes may be tapered, or the material having carbon nanotubes dispersed therein may be a highly resistive material.

This specification,includes part or all of the contents as disclosed in the specification and/or drawings of Japanese Application No. 2000-123180, which is a priority document of the present application.

The above and other objects, effects, features and advantages of the present invention will become more apparent from the following description of embodiments thereof taken in conjunction with the accompanying drawings.

DETAILED DESCRIPTION OF THE INVENTION

Hereinbelow, preferred embodiments of the present invention will be illustrated in detail with reference to the drawings attached.

Embodiment 1

Figure 1A:
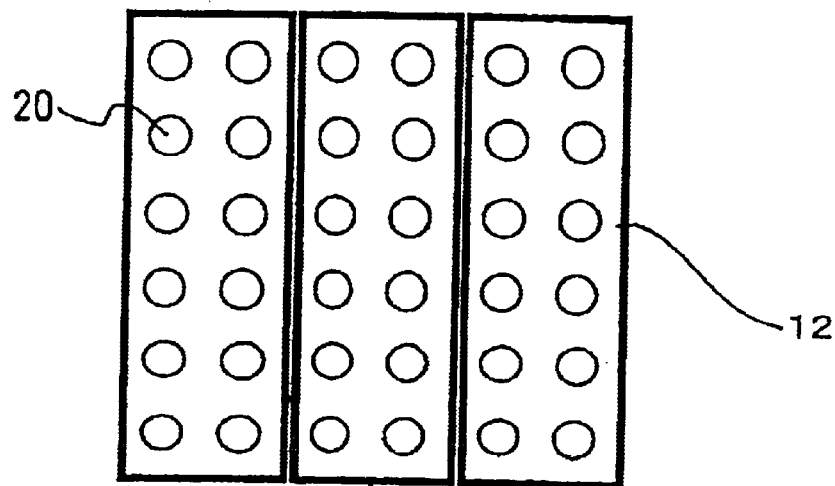
FIGS. 1(a) and 1(b) are plan views showing the arrangement of a metal mask in a cold cathode electron source according to the first embodiment of the present invention upon the application of a conductive paste.
Figure 1B:
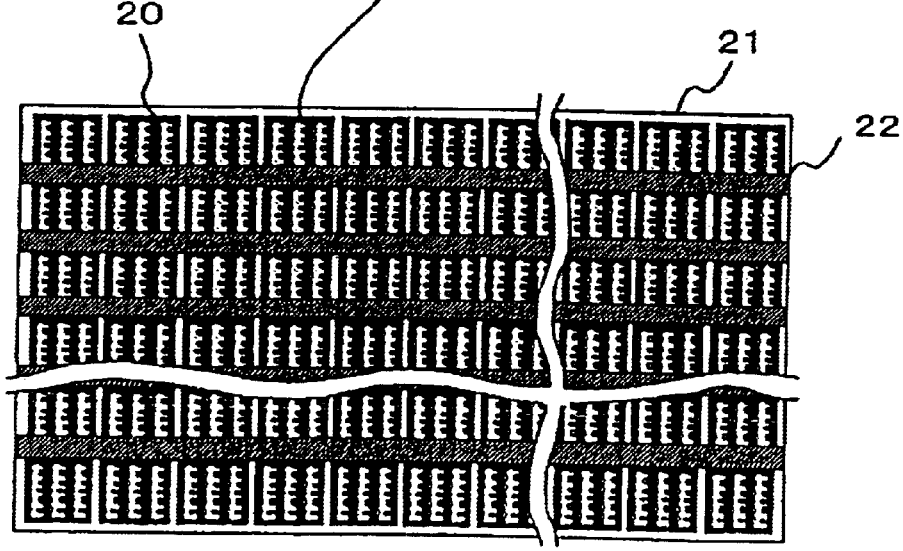

FIGS. 1(a) and 1(b) are plan views showing the arrangement of a metal mask in a cold cathode electron source according to the first embodiment of the present invention upon the application of a conductive paste; FIG. 1(b) shows an overall view thereof and FIG. 1(a) shows an enlarged view of the essential part thereof.

In FIGS. 1(a) and 1(b), numeral 21 designates an unsintered, low-temperature-calcinable ceramic sheet (hereinafter, also referred as a "green sheet") having a size of, for example, 87 cm×50 cm×100 µm (thickness). In the green sheet 21, through-holes 20 (φ25 µm) are formed using a puncher (e.g., a multi-axis high-speed punching machine). The hole pitch of each through-hole is, for example, 62.5 µm and the number of the through-holes per pixel is 36 (12 holes per subpixel 12). The total number of the pixels is about 1,310,000 (1280×1024). The number of the through-holes per pixel may also be 1 and may be selected appropriately depending on the current density required and the pixel size. The formation of the through-holes may be performed using other means, such as laser beam machining, electric discharge machining or microwave machining. As shown in FIG. 1(b), the green sheet 21 having the through-holes 20 is provided with a metal mask 22, onto which a conductive paste is applied.

The conductive paste contains an electron emitting material. An example of the conductive layer is a dispersion consisting of carbon nanotubes (φ20 nm, length: 5 µm), silver microparticles and ethyl cellulose (an organic binder) in terpinol (a diluent).

Figure 2:
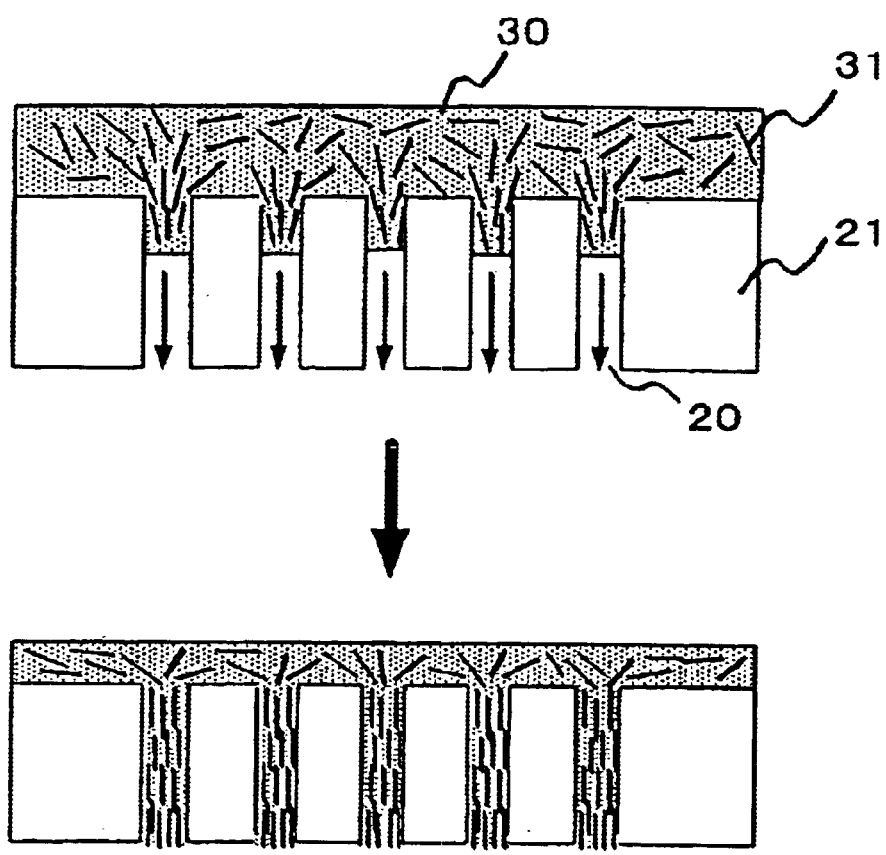
FIG. 2 is a cross sectional view showing the charging process of a conductive paste into through-holes and the orientation process of carbon nanotubes in the through-holes in a cold cathode electron source according to the first embodiment of the present invention.

FIG. 2 is a cross sectional view showing the charging process of a conductive paste into through-holes and the orientation process of carbon nanotubes in the through-holes.

The behavior of the conductive paste and the carbon nanotubes in the conductive paste upon the vacuum suction into the through-holes is shown in FIG. 2 in the enlarged manner. As shown in FIG. 2, the conductive paste 30 is sucked and charged into the through-holes 20 in the green sheet 21 by the vacuum suction from the backside of the green sheet 21. Upon the vacuum suction, the carbon nanotubes 31 contained in the conductive paste 30 are oriented in the axis direction of the through-holes 20, where the tips of some of the carbon nanotubes 31 are exposed at the back openings of the through-holes 20.

In this cold cathode array, the exposed carbon nanotubes 31 serve as an emitter.

Figure 3:
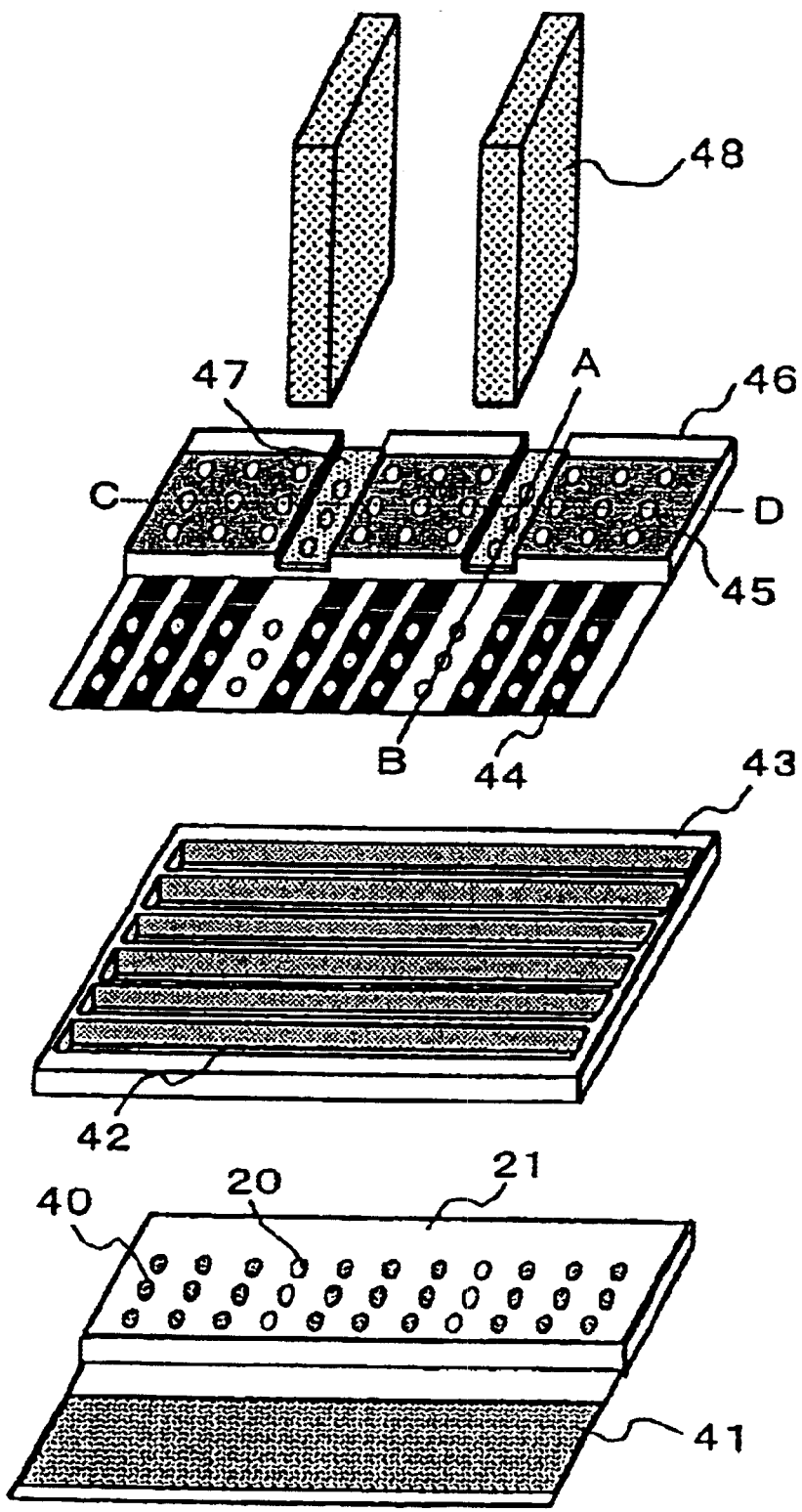
FIG. 3 is a perspective view showing an example of the laminated constitution of a cold cathode electron source according the first embodiment of the present invention.

FIG. 3 is a perspective view showing an example of the laminated constitution of the cold cathode electron source.

In FIG. 3, emitter sections (i.e., electron-emitting sections) 40 are formed on the green sheet 21 (i.e., a first layer), and emitter lines 41 are provided on the backside of the green sheet 21. In this embodiment, a ballast resistor layer (not shown) may be provided between the emitter sections 40 and the emitter lines 41.

For the purpose of maintaining the gap between the gate electrode and the emitter sections 40, a green sheet 43 for gap control use having holes 42 is laminated on the first layer. A green sheet 46 for circuit board formation (i.e., a second layer) having both a gate electrode 44 on the back surface and a focusing electrode 45 on the upper surface is laminated on the green sheet 43 for gap control use. On the green sheet 46 for circuit board formation, ditches 47 for mounting spacers 48 are formed. A cement is applied on the ditches 47 for the purpose of cementing the spacers 48 and controlling the gaps between the spacers 48 and the ditches 47.

Figure 4:
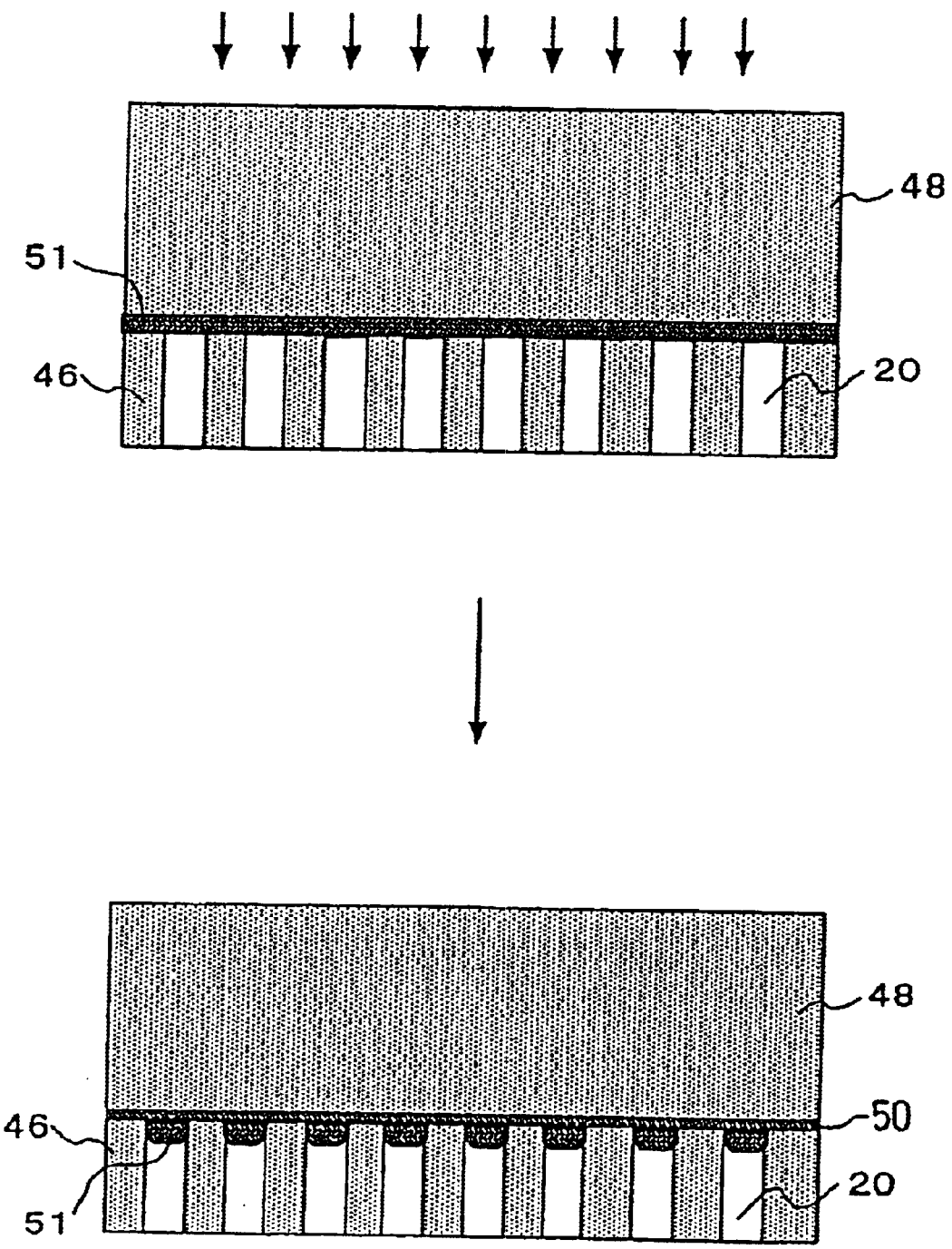
FIG. 4 is a cross sectional view taken along the line A–B of FIG. 3.
Figure 5:
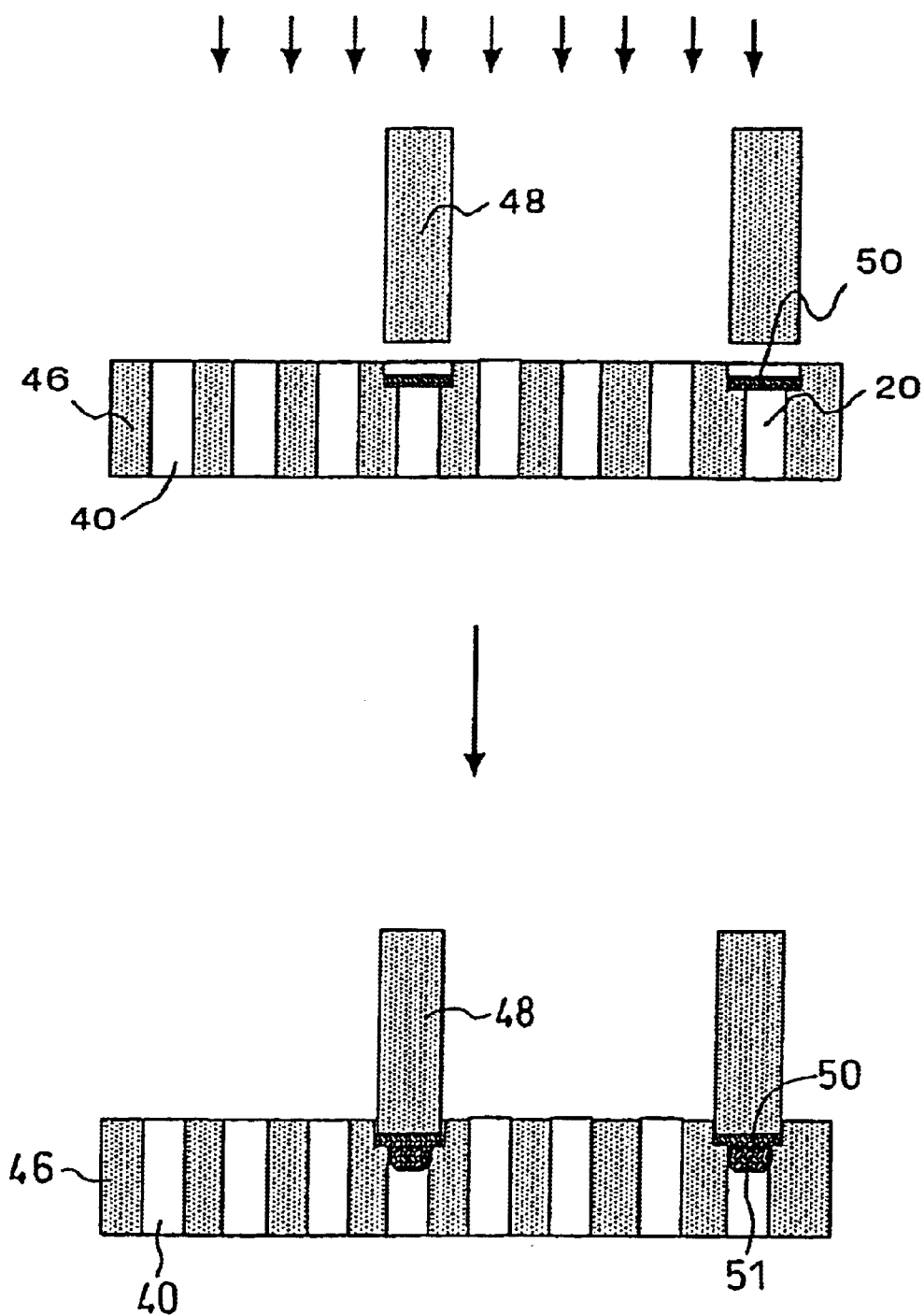
FIG. 5 is a cross sectional view taken along the line C–D of FIG. 3.

FIG. 4 is a cross sectional view taken along the line A–B of FIG. 3 and FIG. 5 is a cross sectional view taken along the line C–D of FIG. 3, both which show the state of the cementing of the spacers 48 at the lines A–B and C–D, respectively.

As shown in these figures, upon the cementing of the spacers 48, a portion 51 of the cement 50 is escaped from the through-holes 20 to eliminate the problem of displacement of the gaps.

The sectional laminated constitution is not limited to the one shown in these figures, and the green sheet 43 for gap control use may be eliminated by lowering the emitter surfaces than the surface of the green sheet 21. The functions of the gate electrode 44 and focusing electrode 45 are not limited to those of the designations thereof, and these electrodes may be used for other purposes such as for shielding.

Figure 6:
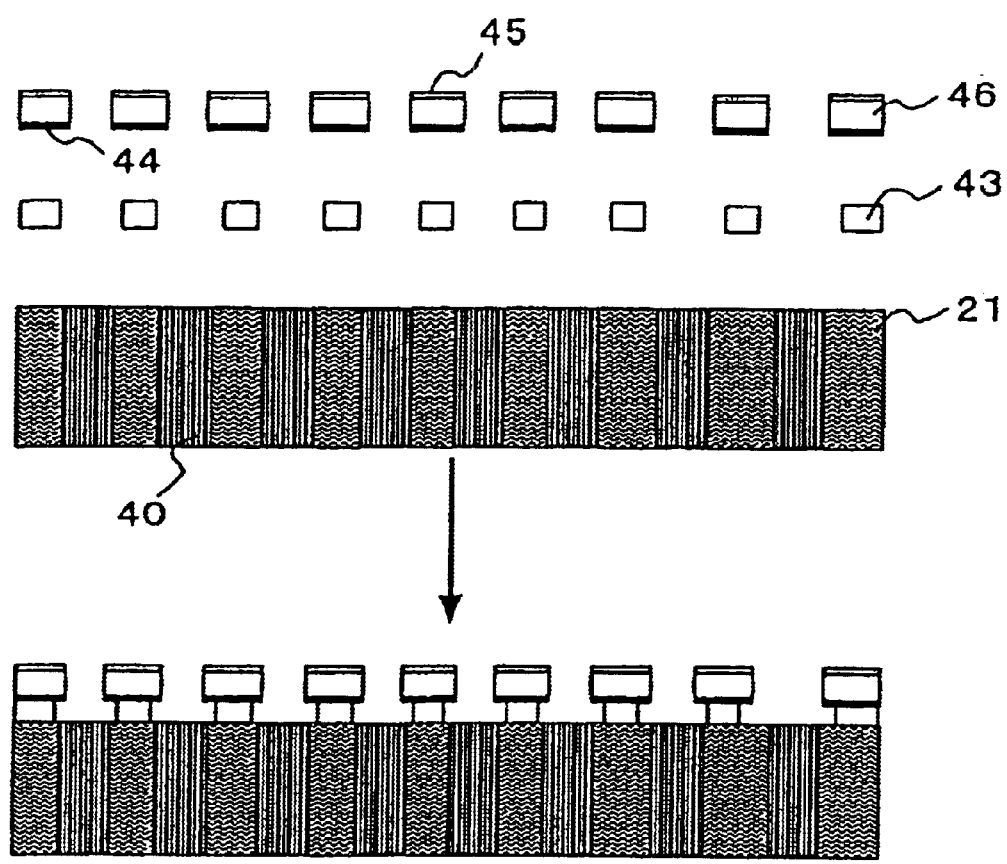
FIG. 6 is a cross sectional view of the essential part of the laminated constitution of the cold cathode electron source of FIG. 3.

FIG. 6 is a cross sectional view of the laminated constitution of the cold cathode electron source of FIG. 3.

The three green sheets 21, 43 and 46 are laminated in the order shown in FIG. 6 and then calcined at 800° C. to form an integral laminated circuit board.

As shown in FIG. 3, the emitter lines 41 and the emission current control electrode lines (i.e., the lines of the gate electrode or gate lines) 44 form together the X–Y matrix. Thus, the X–Y matrix addressing becomes possible. Since the surfaces of these green sheets are bonded very tightly by the calcination of the laminated structure, no or less gas discharge is observed during the vacuum evacuation. The integral formation of the back plate achieved in this manner makes the handling in the subsequent steps and the alignment of the back plate easy.

As described above, the cold cathode electron source according to this embodiment uses a cold cathode material that enables the electron emission in a low electric field (e.g., a carbon nanotube) and prepared by providing the essential constituent elements individually in or on uncalcined ceramic sheets (i.e., the green sheets 21, 43 and 46) and then laminating and calcining the sheets to form an integral structure. Since no emitter line is placed in the vacuum sealing tubes, the cold cathode electron source is advantageous in maintaining the vacuum level of the space between the face plate and the back plate and enables the ready insulation between the emitter lines and the gate lines. Accordingly, it becomes possible to manufacture at low cost a device with a field emission type of electron source array which can achieve vacuum evacuation and maintenance of the vacuum level readily.

The process for manufacturing the electron source array comprises forming through-holes 20 in a flat plate, charging a conductive paste 30 containing carbon nanotubes 31 dispersed therein into the through-holes 20 by suction, thereby causing to orient the carbon nanotubes 31 in the axis direction of the through-holes 20 in the plate. Since the orientation of the carbon nanotubes in the axis direction of the through-holes can be achieved readily, it becomes possible to manufacture at a low cast a device with a field emission type of electron source array which can achieve a high emission current density at a low voltage.

Even for a low-temperature-calcinable ceramic sheet, a laminated structure thereof requires a temperature as high as 800–900° C. for calcination. As a result, the discharge of gas generated from the material upon the vacuum evacuation can be reduced. In addition, when carbon nanotubes with caps at their tips (i.e., with closed tips) are used, the caps can be removed by the effect of such a high temperature. Therefore, a process for improving the emission property of such carbon nanotubes is not necessary.

Embodiment 2

Figure 7:
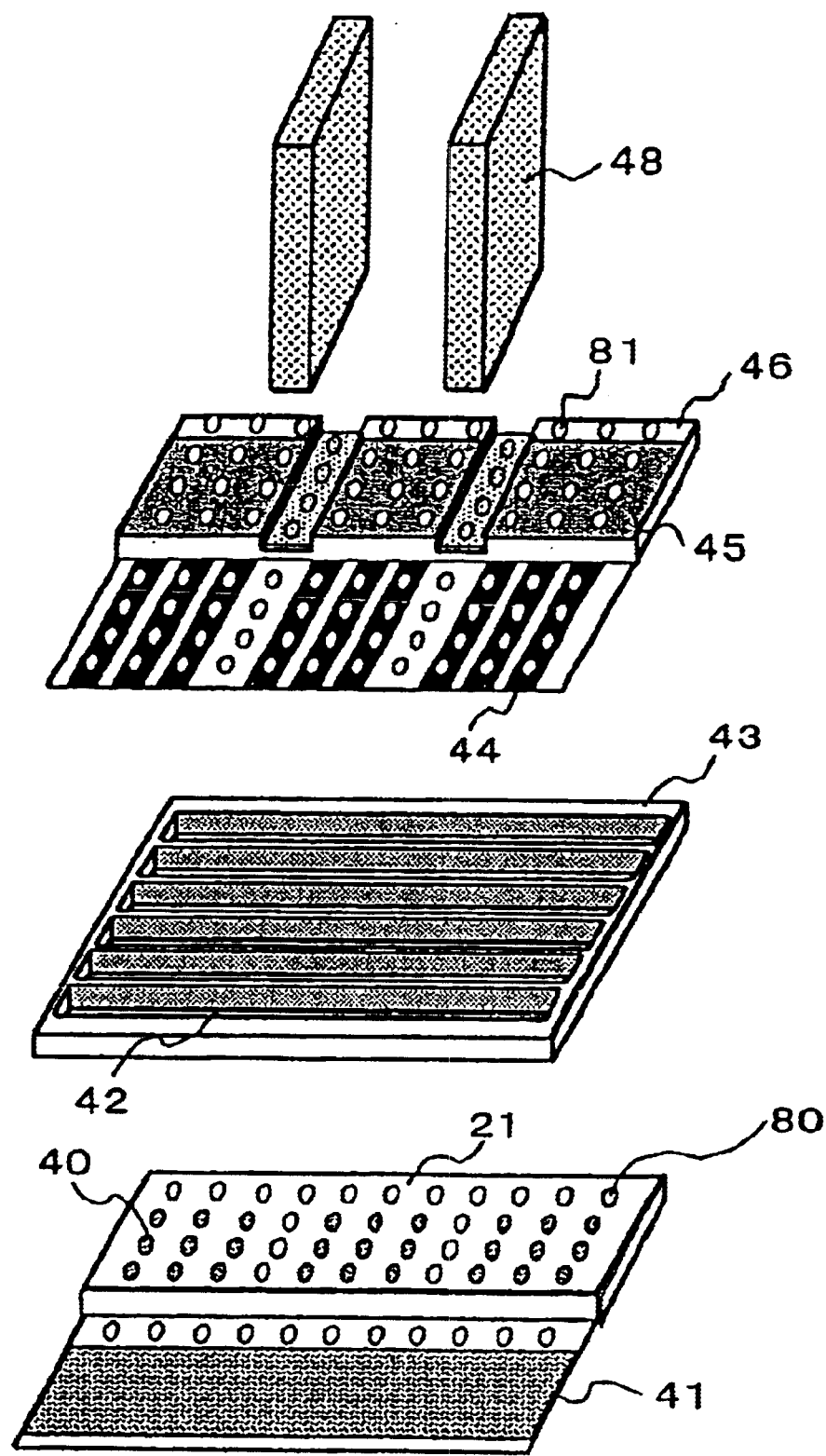
FIG. 7 is a perspective view showing an example of the laminated constitution of a cold cathode electron source according the second embodiment of the present invention.

FIG. 7 is a perspective view showing an example of the laminated constitution of a cold cathode electron source according the second embodiment of the present invention.

Figure 8:
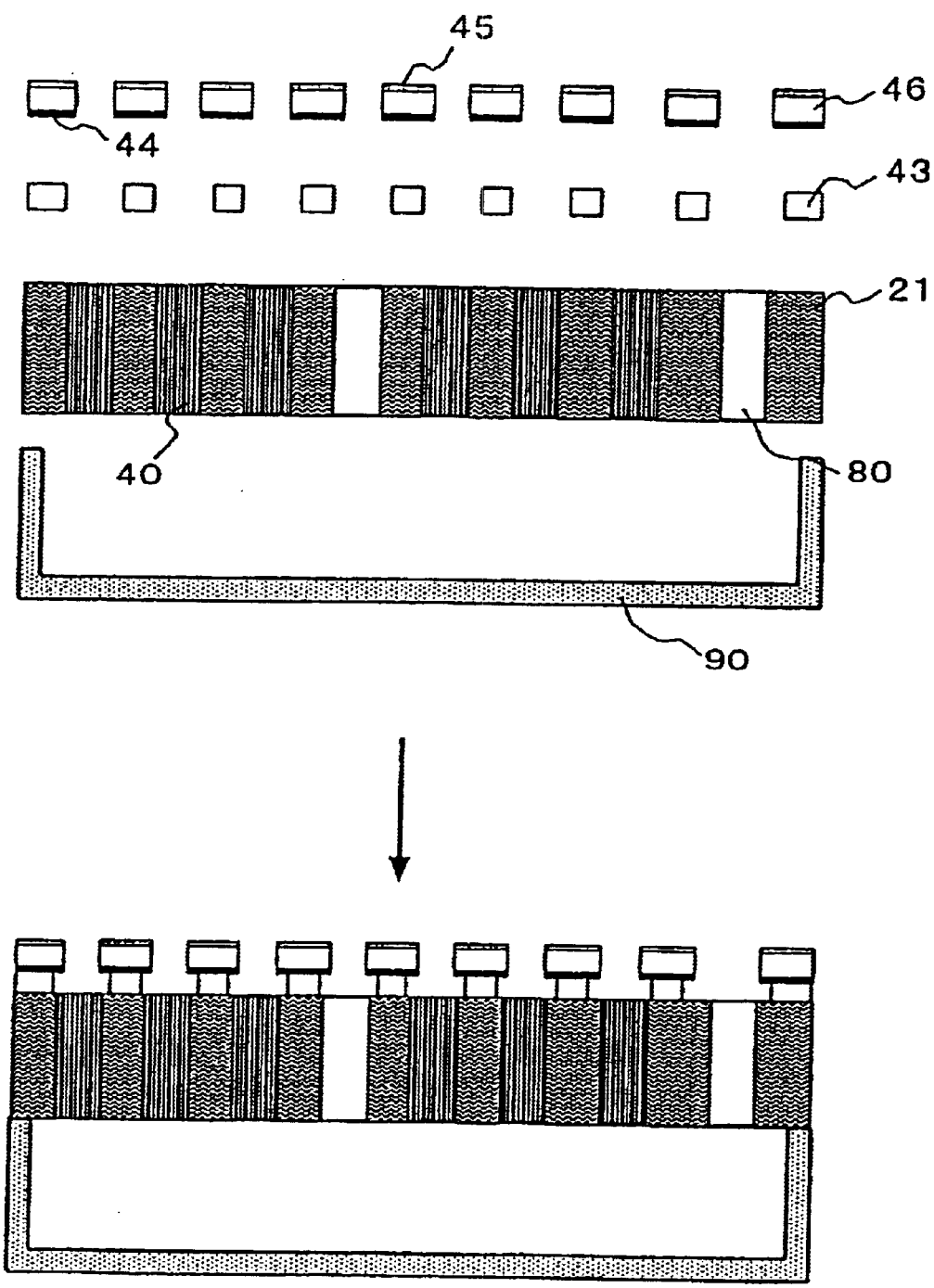
FIG. 8 is a cross sectional view of the essential part of the laminated constitution of the cold cathode electron source of FIG. 7.

FIG. 8 is a cross sectional view of the laminated constitution of the cold cathode electron source of FIG. 7. In the figure, the elements like those in FIG. 3 are given like reference characters.

This embodiment is characterized in that a room for gettering is additionally provided.

As shown in FIG. 7, during the charge of the cold cathode material into the through-holes 20 provided in the ceramic sheet 21, the through-holes 20 are partially masked to provide uncharged through-holes 80 which serve as through-holes for vacuum evacuation. Such uncharged through-holes for vacuum evacuation 81 are also formed in the ceramic sheet 46. The three green sheets 21, 43 and 46 and a room 90 for gettering are laminated in the order shown in FIG. 8 and then calcined at 800° C., thereby forming an integral laminated circuit board.

In this manner, by providing on the back plate a plurality of through-holes for vacuum evacuation 80 uncharged with the cold cathode material and providing a room 90 for gettering on the backside of the back plate, it becomes possible to manufacture at low cost a device with a field emission type of electron source array which can achieve vacuum evacuation and maintenance of the vacuum level readily.

Embodiment 3

Figure 9:
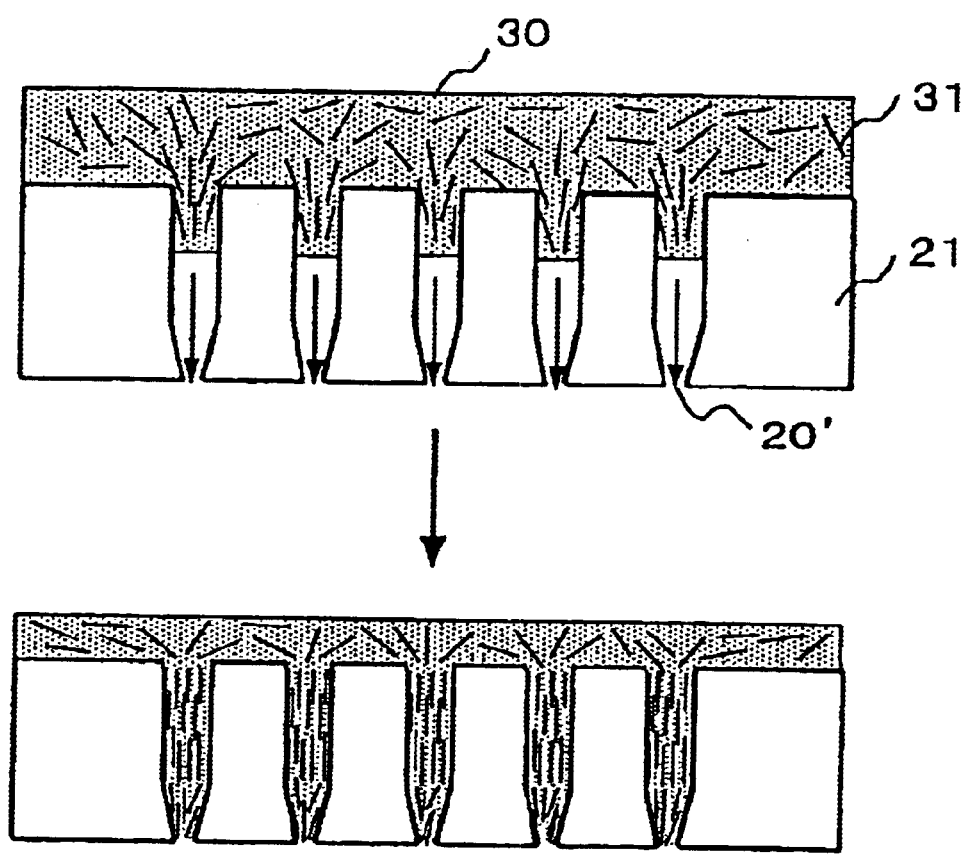
FIG. 9 is a cross sectional view showing the charging process of a conductive paste into through-holes and the orientation process of carbon nanotubes in the through-holes in a cold cathode electron source according to the third embodiment of the present invention.
Figure 10A:
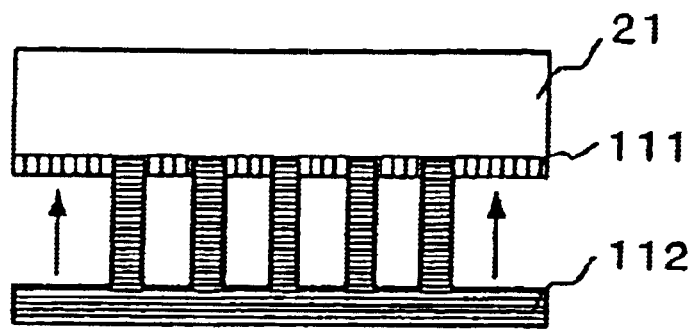
FIGS. 10(a) to 10(e) are cross sectional views showing the charging process of a conductive paste into through-holes and the orientation process of carbon nanotubes in the through-holes in a cold cathode electron source according to the fourth embodiment of the present invention.
Figure 10B:
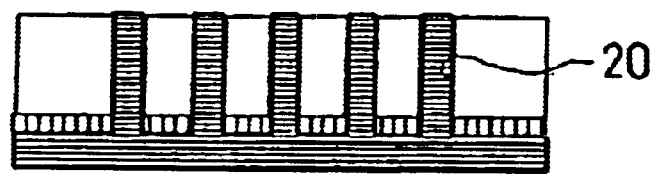
Figure 10C:
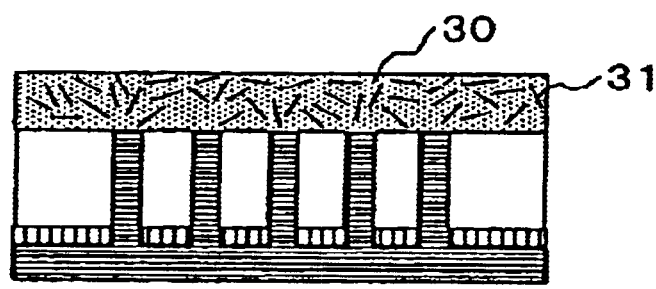
Figure 10D:
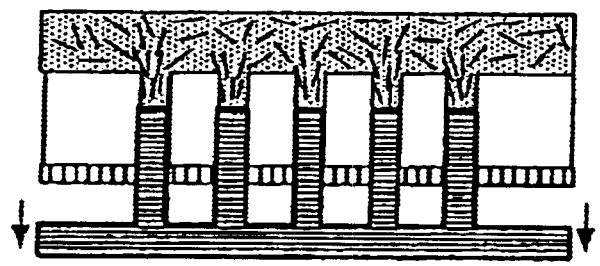
Figure 10E:

FIG. 9 is a cross sectional view showing the charging process of a conductive paste into through-holes and the orientation process of carbon nanotubes in the through-holes in a cold cathode electron source according to the third embodiment of the present invention. In the figure, the elements like those in FIG. 2 are given like reference characters.

This embodiment is characterized in that the through-holes formed in the green sheet of the first layer are tapered.

As shown in FIG. 9, tapered through-holes 20' are formed in the green sheet 21.

As a result, as in the case of Embodiment 1, upon the charging the conductive paste 30 into the through-holes 20' from the backside of the green sheet 21 by vacuum suction, the carbon nanotubes 31 contained in the conductive paste 30 can be oriented toward the center of the axis of each of the through-holes 20'. According to this constitution, if the emission current control electrode (i.e., the gate electrode) is used as an extraction electrode, the field enhancement factor β becomes larger, which enables to drive the cold cathode electron source at a lower voltage.

Embodiment 4

FIGS. 10(*a*) to 10(*e*) are cross sectional views showing the charging process of a conductive paste into through-holes and the orientation process of carbon nanotubes in the through-holes in a cold cathode electron source according to the fourth embodiment of the present invention.

This embodiment is characterized in that formation of the through-holes and charge of the conductive paste into the through-holes are performed using a needle for punching.

A needle 112 for punching equipped with a hold-down jig 111 is used to form the through-holes 20 in the green sheet 21 prepared as in Embodiment 1, as illustrated in FIGS. 10(*a*) and 10(*b*). In the state where the needle 112 for punching completely penetrates the green sheet 21 (FIG. 10(*b*)), the conductive paste 30 containing the carbon nanotubes 31 is applied (FIG. 10(*c*)).

Next, as shown in FIG. 10(*d*), the needle 112 for punching is pulled out slowly, whereby the conductive paste 30 is sucked and charged into the through-holes 20 on the same principle as for a syringe. The carbon nanotubes 31 in the conductive paste 30 are charged with the orientation in the axis direction of the through-holes 20 (FIG. 10(*e*)).

According to this embodiment, since the charge of the conductive paste 30 into the through-holes 20 can be controlled readily, it becomes possible to prevent the squeeze out of the conductive paste 30 from the ends of the through-holes.

Embodiment 5

Figure 11:
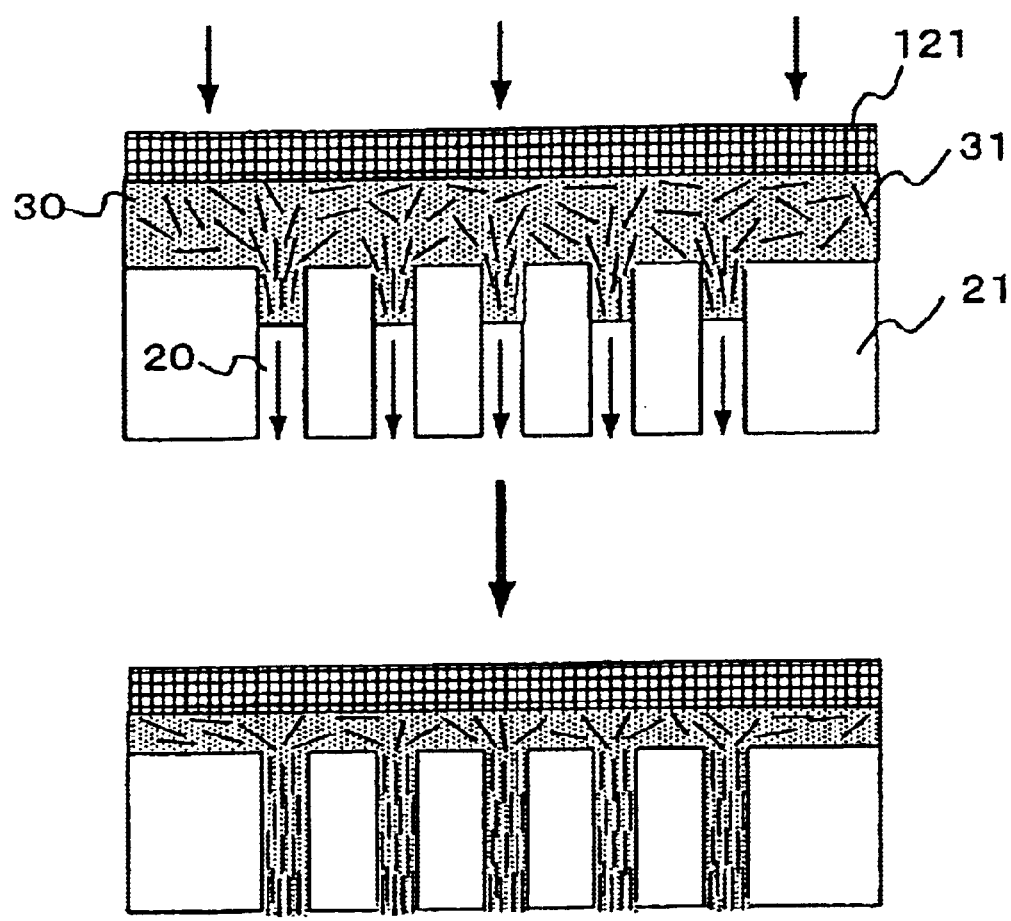
FIG. 11 is a cross sectional view showing the charging process of a conductive paste into through-holes and the orientation process of carbon nanotubes in the through-holes in a cold cathode electron source according to the fifth embodiment of the present invention.

FIG. 11 is a cross sectional view showing the charging process of a conductive paste into through-holes and the orientation process of carbon nanotubes in the through-holes in a cold cathode electron source according to the fifth embodiment of the present invention. In the figure, the elements like those in FIG. 2 are given like reference characters.

This embodiment is characterized in that a pressing instrument is used for charging the conductive paste into the through-holes.

In the same manner as in Embodiment 1, the through-holes 20 are formed in the green sheet 21. The conductive paste 30 is then applied on the upper surface of the green sheet 21 as illustrated in FIG. 11. Pressure is applied onto the conductive paste 30 using a pressing instrument 121 from the conductive paste-applied surface of the green sheet 21 to press-charge the conductive paste 30 into the through-holes 20. In this manner, the carbon nanotubes 31 in the conductive paste 30 are oriented in the axis direction of the through-holes.

The means for press-charging the conductive paste 30 is not limited to the one employed in this embodiment, and may be other means such as injection of a pressure-applied conductive paste from a nozzle. According to this embodiment, since the charge of the conductive paste 30 into the through-holes 20 can be controlled more readily, it becomes possible to prevent the squeeze out of the conductive paste 30 from the ends of the through-holes 20.

Embodiment 6

Figure 12:
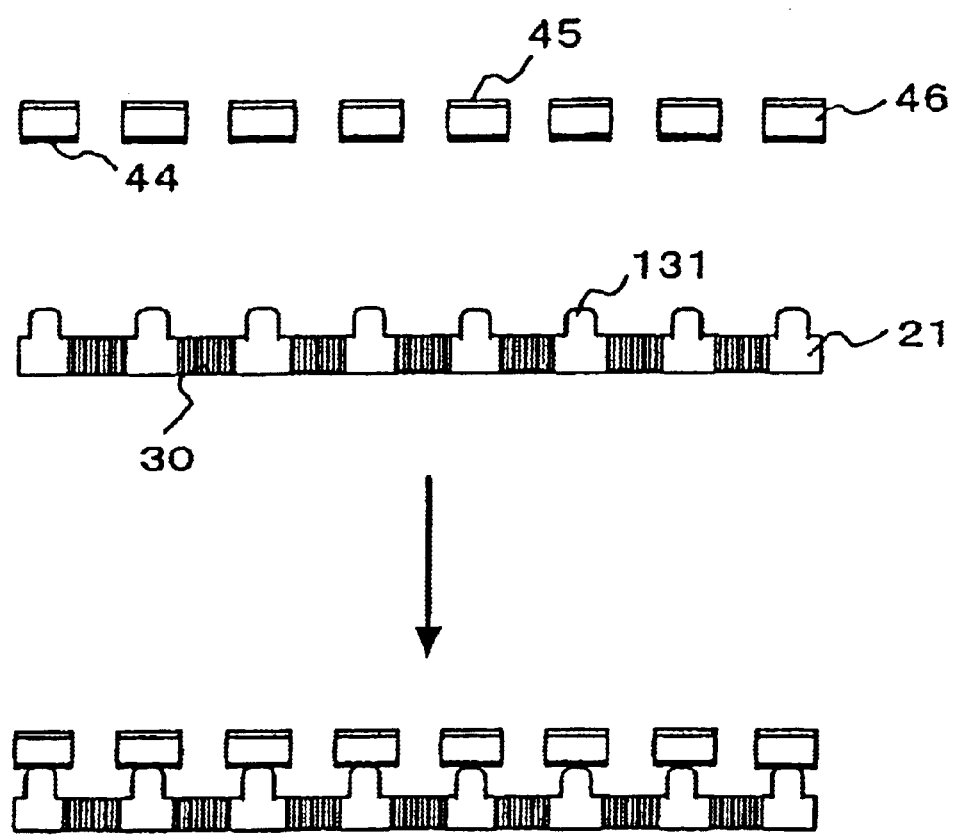
FIG. 12 is a cross sectional view showing the substrates constituting a cold cathode electron source according to the sixth embodiment of the present invention and an example of the built-up structure of the substrates which form the X–Y matrix.

FIG. 12 a cross sectional view showing the substrates constituting a cold cathode electron source according to the sixth embodiment of the present invention and an example of the built-up structure of the substrates which form the X–Y matrix.

This embodiment is characterized in that the green sheet 43 for gap control use is eliminated from the structure of Embodiment 1 shown in FIG. 3.

As shown in FIG. 12, stripe-shaped ribs 131 (height: 25 $\mu$m, width: 25 $\mu$m, pitch: 125 $\mu$m) are formed on the green sheet 21 by press machining. A cold cathode array is formed using this green sheet 21 in the same manner as in Embodiments 1 to 5. A circuit board comprising the green sheet 46 as mentioned in Embodiment 1 is separately formed. The green sheets 21 and 46 are laminated in the order shown in FIG. 12 and then calcined at 800° C., thereby forming an integral laminated circuit board.

In this embodiment, the ribs 131 serve as the green sheet 43 for gap control use in Embodiments 1 to 5. Accordingly, the green sheet 43 for gap control use can be eliminated. This embodiment is also advantageous when it is intended to put the emission current control electrode 44 close to the cold cathode array.

Embodiment 7

Figure 13:
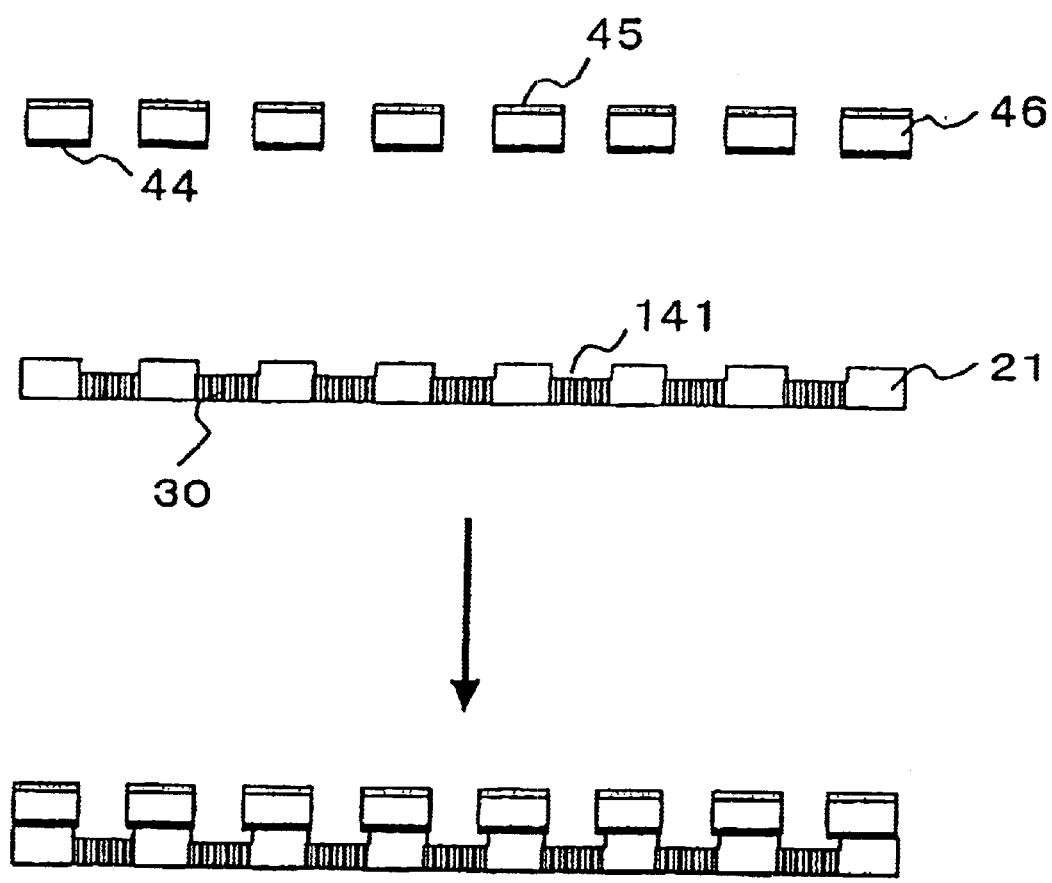
FIG. 13 is a cross sectional view showing the substrates constituting a cold cathode electron source according to the seventh embodiment of the present invention and an example of the built-up structure of the substrates which form the X–Y matrix.
Figure 14:
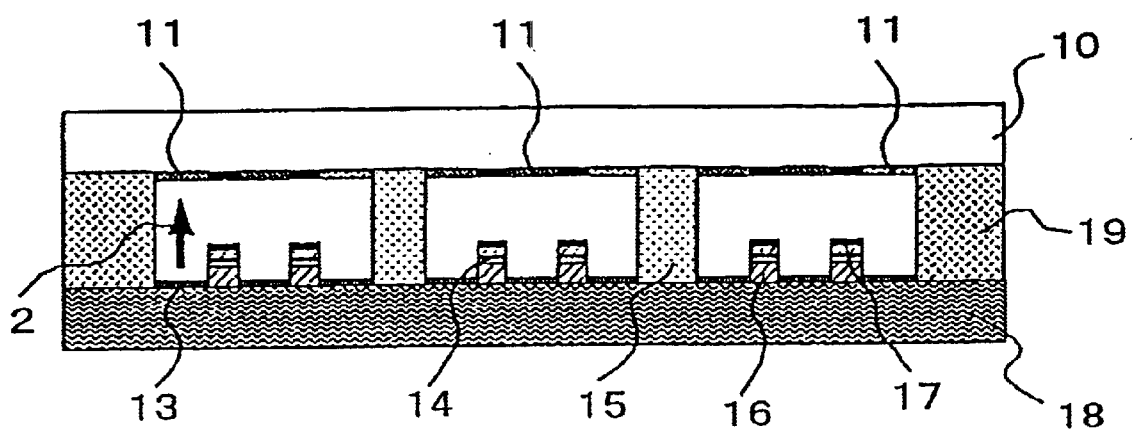
FIG. 14 is a cross sectional view showing a prior art cold cathode with carbon nanotubes.

FIG. 13 is a cross sectional view showing the substrates constituting a cold cathode electron source according to the seventh embodiment of the present invention and an example of the built-up structure of the substrates which form the X–Y matrix.

In the cold cathode array formed in the same manner as in Embodiments 1 to 5, an upper portion of the conductive paste 30 charged is removed from the through-holes 20 in the green sheet 21 to the depth of 25 $\mu$m (see reference character 141), thereby forming a green sheet 21. The green sheet 46 constituting the circuit board is provided in the same manner as in Embodiment 6. The green sheets 21 and 46 are laminated in the order shown in FIG. 13 and then calcined at 800° C., thereby forming an integral laminated circuit board.

According to this embodiment, the gap can be controlled by adjusting the depth of the conductive paste 30 removed. Since the green sheets without any protrusion are bonded together, it becomes easy to handle the green sheets. In addition, as in the case of Embodiment 6, this embodiment is advantageous when it is intended to put the emission current control electrode 44 close to the cold cathode array.

Embodiment 8

In Embodiments 1 to 5, a silver-palladium-glass-based resistive paste may be used in place of the conductive paste containing silver microparticles. In this embodiment, a resistive paste having, for example, a resistivity of 200 $\Omega$·cm is used. This corresponds to the insertion of a resistor having a resistance value of 1.2 M$\Omega$ into the individual through-holes in parallel. The insertion of such a ballast resistor into the through-holes enables to reduce the variation in electron emission properties in the through-holes, improve the current uniformity in the plane and prevent the destruction of the electron emitting sections. In addition, since it is not necessary to prepare a ballast resistor layer, the manufacture process becomes simpler.

Alternatively, it may be possible to make the paste containing the carbon nanotubes insulative and cover the surface of the exposed carbon nanotubes with a conductive material. According to this contrivance, it becomes possible to decrease the resistance value of the paste containing the carbon nanotubes. If the paste is used as is as a material for a printed wiring, the manufacture process may become simpler. In addition, since the necessity of incorporation of conductive material microparticles (e.g., silver microparticles) to the paste is eliminated, the paste becomes a simpler dispersion system and it becomes possible to disperse the carbon nanotubes in the paste more uniform.

As stated above, according to the present invention, a back plate can be manufactured without the need of a complicated manufacture process or any expensive apparatus, since it is not needed to form the layers of a resistor, a wiring and a insulator using a vacuum apparatus.

In the present invention, the constituent layers are separately prepared and then the layers are laminated together and calcined. Accordingly, the throughput of the process can be improved.

According to the present invention, since a material such as a carbon nanotube is incorporated in the conductive paste, it becomes possible to manufacture at low cost a device with a field emission type of electron source array which can achieve a high emission current density at a low voltage.

In the cold cathode electron source, no emitter line is placed in a vacuum sealing tube. Accordingly, the vacuum level of the tube can be maintained effectively and insulation from gate lines can be achieved readily.

Further, even for a low-temperature-calcinable ceramic substrate, a laminated structure thereof requires a temperature as high as 800–900° C. for the calcination. According to the present invention, the discharge of gas generated from the material upon the vacuum evacuation can be reduced by the effect of such a high temperature.

When through-holes uncharged with a cold cathode material are formed on a back plate, evacuation can be performed from the backside of the back plate. In the application to a large-screen display, the reduction in evacuated conductance is prevented and the spatial limitation in placement of a getter is eliminated, and therefore a satisfactory evacuation rate can be achieved.

According to the process for manufacturing the electron source of the present invention, carbon nanotubes can be oriented in a conductive paste in the axis direction of through-holes provided in a flat plate readily. Even for a low-temperature-calcinable ceramic substrate, a laminated structure thereof requires a temperature as high as 800–900° C. for the calcination. When carbon nanotubes with caps at their tips (i.e., with closed tips) are used, the caps can be removed by the effect of such a high temperature and, therefore, any process for improving the emission property of such carbon nanotubes is unnecessary.

All publications, patents and patent applications cited herein are incorporated herein by reference in their entirety.

The invention has been described in detail with reference to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An electron source comprising a first sheet including a support portion formed of a calcinable material, a cathode electrode and an emitter; a second sheet including a support potion formed of a calcinable material and a control electrode, said first and second sheets each defining a plurality of through-holes disposed in spaced relationship to one another, said second sheet being disposed on said first sheet such that said plurality of through holes in said second sheet are disposed in substantially registered relation with at least some of the plurality of through-holes in said first sheet such that said first and second sheets are substantially aligned with one another; and at least one spacer disposed on said second sheet; further wherein said emitter comprises at least one carbon nanotube disposed in each of preselected ones of the plurality of through-holes in said first sheet in substantial axial alignment therewith, and wherein said first and second sheets are calcined so as to form an integral, multi-layered structure having at least one spacer bonded thereto.

2. The electron source according to claim 1, wherein said first sheet includes a backside adjacent to said second sheet, and a room for gettering is provided by said backside.

3. The electron source according to claim 1, wherein the emitting section emits electrons at a field strength of 10V/$\mu$m or lower.

* * * * *